2 Sheets—Sheet 1.

R. M. CUMMINGS.
HORSESHOE NAIL-MACHINE.

No. 192,236. Patented June 19, 1877.

WITNESSES
Henry N. Miller
Frank Galt

INVENTOR
Richard M. Cummings,
Alexander Mason,
ATTORNEYS

N. PETERS, PHOTO-LITHOGRAPHER, WASHINGTON, D. C.

2 Sheets—Sheet 2.
R. M. CUMMINGS.
HORSESHOE NAIL-MACHINE.
No. 192,236. Patented June 19, 1877.
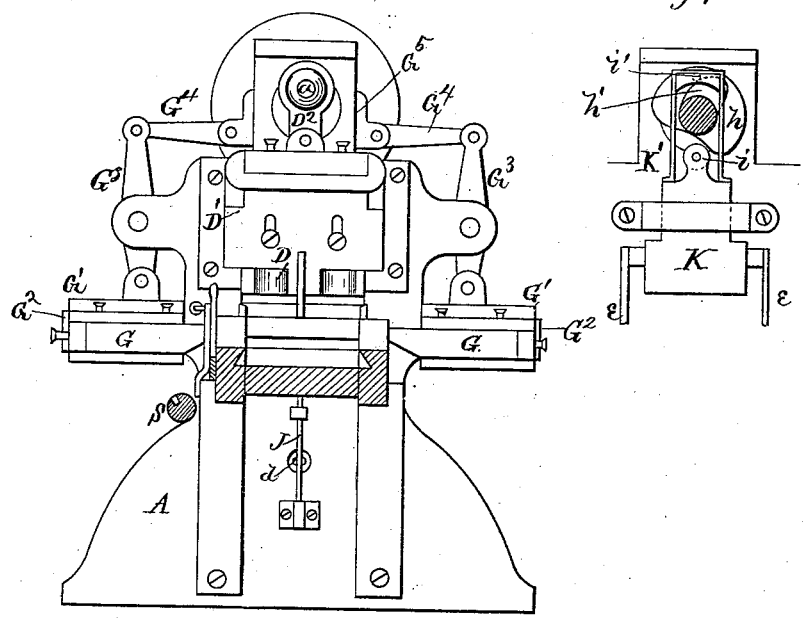
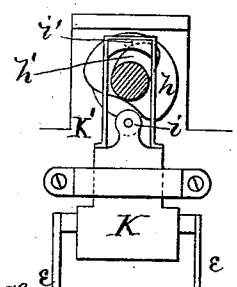
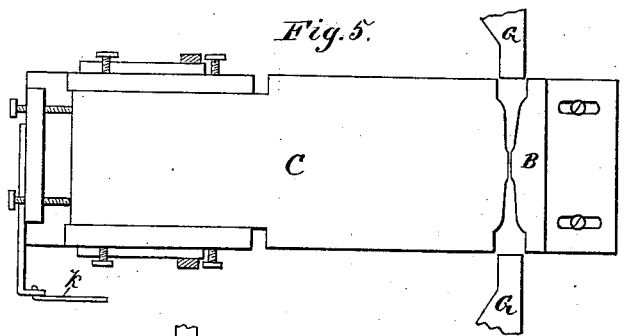
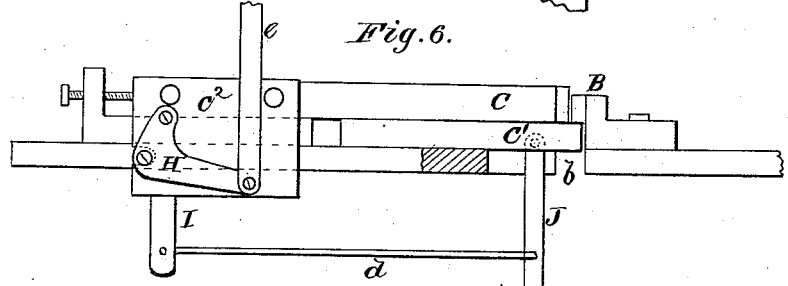
WITNESSES
Henry N. Miller
INVENTOR
Richard M. Cummings,
Alexander & Mason
ATTORNEYS

UNITED STATES PATENT OFFICE.

RICHARD M. CUMMINGS, OF NASHUA, NEW HAMPSHIRE.

IMPROVEMENT IN HORSESHOE-NAIL MACHINES.

Specification forming part of Letters Patent No. 192,236, dated June 19, 1877; application filed May 29, 1877.

*To all whom it may concern:*

Be it known that I, RICHARD M. CUMMINGS, of Nashua, in the county of Hillsborough and State of New Hampshire, have invented certain new and useful Improvements in Horseshoe-Nail Machines; and do hereby declare that the following is a full, clear, and exact description thereof, reference being had to the accompanying drawings, and to the letters of reference marked thereon, making a part of this specification.

The nature of my invention consists in the construction and arrangement of a machine for making horseshoe-nails, as will be hereinafter more fully set forth.

In order to enable others skilled in the art to which my invention appertains to make and use the same, I will now proceed to describe its construction and operation, referring to the annexed drawings, in which—

Figure 1:
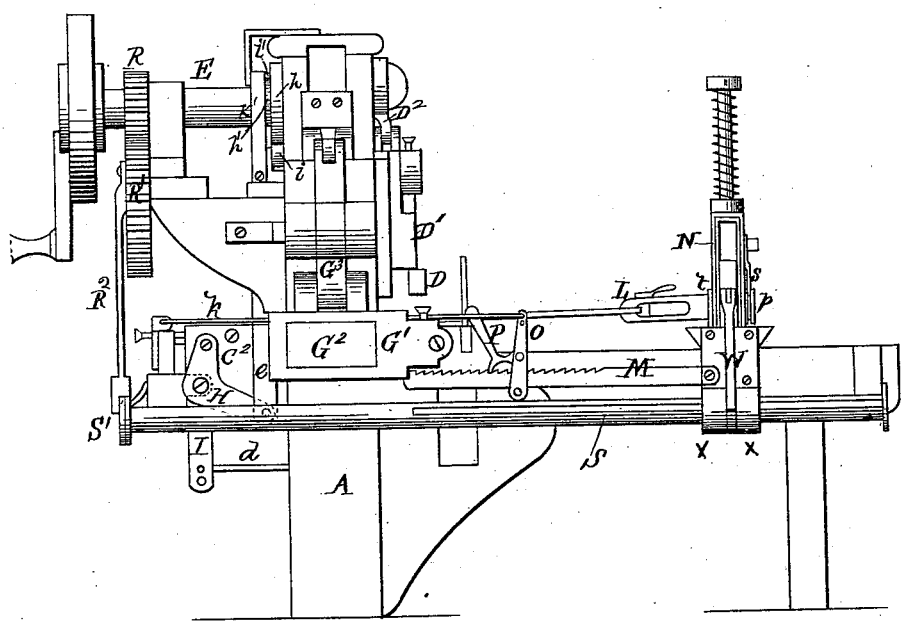
Figure 3:
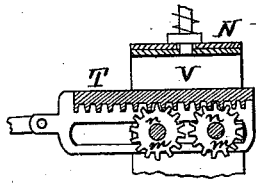
Figure 2:
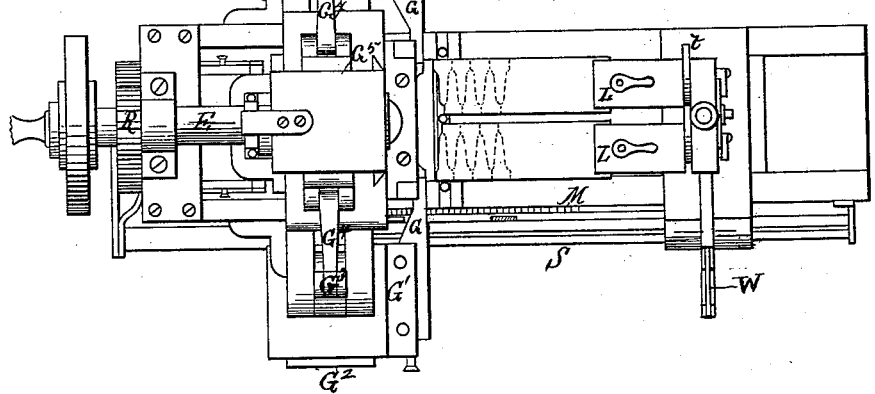

Figure 1 is a side elevation of my improved horseshoe-nail machine. Fig. 2 is a plan view of the same. Fig. 4 is a transverse vertical section thereof. Figs. 3, 5, 6, and 7 are detailed views of parts of the machine.

A represents the frame, which is constructed in any suitable manner to receive the various operating parts of the machine.

In this machine I make two nails at each revolution of the shaft by means of two revolving plate-holders throwing the nail-plates in position to be cut, leaving the heads on the outsides of the die in position to be upset by the heading-tools working on each side of the frame.

B represents the stationary die, and C is a movable die, moving horizontally up against the stationary die. D is the vertically reciprocating cutting-die, adjustably attached to a head, $D^1$, moving in suitable guides and connected by a pitman, $D^2$, with a crank, $a$, on the main driving-shaft E, to which power is applied in any suitable manner.

The vertically reciprocating cutting-die D cuts a nail from each of the two plates, and carries the nails thus cut down into the die B C, lodging them on a movable bar, $C^1$. The die C then moves up and holds the nails against the stationary die B while the heading-tools G G upset and form the heads. The die C then moves back from the nails, and the movable bar $C^1$ at the same time moves back past the edges of the die C, allowing the nails to drop through an opening, $b$, in the frame.

The heading-tools G are held in holders $G^1$, which slide on bars $G^2$ on each side of the frame, and said tools are adjusted in the holders by suitable set-screws.

The tool-holders $G^1$ are moved out and in on the guide-bars $G^2$ by means of pivoted levers $G^3$, the lower ends of which are connected to the holders, and the upper ends connected by pivoted arms $G^4$ with a head, $G^5$, moving up and down in suitable guides forming part of the main frame, and said head operated by means of an eccentric on the main shaft E.

The movable die C and movable or slide bar $C^1$ are operated by means of two knee-levers, H H, working the die-holder $C^2$, in which the die C is adjusted and held. An arm, I, extending from the die-holder $C^2$, is connected by a rod, $d$, with a lever, J, pivoted at one end, and the other end connected with the movable bar $C^1$, thereby giving it a longer travel than the die C, moving it past its edges and allowing the nail to drop through.

The knee-levers H are connected by rods $e$ with a fork or forked slide-bar, K, driven by a cam, $h$, on the main shaft E, said cam working on a friction-roller, $i$, on its downward stroke, and so constructed as to give a rest long enough for the heads of the nails to be upset by the heading-tools G G. The return stroke is effected by a cam, $h'$, working against a roll, $i'$, in the yoke $K'$ of the slide-bar K.

The plate-holders L L, which revolve the plates, are fed up by a rack, M, attached to the carriage N, and the lever O, working the pawl P, is operated by motion from the die-holder $C^2$ connected to said lever by a rod, $k$, while the cutters or cutting-dies are up and after the plates have been revolved, and in time before the cut is made again.

The plate-holders L L are revolved by a cog-wheel, R, on the main shaft E, meshing with another cog-wheel, $R^1$, having twice the number of teeth, and this latter cog-wheel connected by a pitman, $R^2$, with an arm, S′, projecting from one end of a rocking shaft S. This shaft revolves the plate-holders by two pinions, $m$ $m$, and a rack, T, working in the slot of the holder-block V within the carriage N.

The pinions m have feather-keys, and are movable on the spindles n of the plate-holders, so that the spirally-grooved collars p p and the double guide s give a reciprocating movement to the plate-holders every half-revolution, clearing the plates from the cutters while being reversed.

The cams t on the holders are for clearing the edges of the plates while being turned over. The lever W, working between the two collars X X of the carriage N and working the rack and pinions in the plate-block, has a feather-key, allowing it to slide on the rocker-shaft S with the carriage.

The carriage with holder-block, plate-holders, and devices for operating the holders and carriage are precisely the same as shown and described in Letters Patent No. 190,011, granted to me April 24, 1877; but in said patent I had only one plate-holder, while in the present case I have adapted the same mechanism for two plate-holders, so that two nails are cut at the same time from two different plates.

Having thus fully described my invention, what I claim as new, and desire to secure by Letters Patent, is—

1. The improved machine herein described, constructed and operating in the manner and for the purpose set forth.

2. The combination of the reciprocating die-holder $C^2$, arm I, connecting-rod d, and lever J for operating the reciprocating bar $C^1$, and arranged to give said bar a longer stroke than the die C, substantially as herein set forth.

In testimony that I claim the foregoing I have hereunto set my hand this 24th day of May, 1877.

RICHARD M. CUMMINGS.

Witnesses:
 FRANK GALT,
 H. AUBREY TOULMIN.